US012603787B1

(12) United States Patent
Dunn et al.

(10) Patent No.: US 12,603,787 B1
(45) Date of Patent: **\*Apr. 14, 2026**

(54) VIDEO FILES WITH EMBEDDED DIGITAL SIGNATURES FOR DATA SECURITY AND AUTHENTICATION, RELATED SYSTEMS AND METHODS

(71) Applicant: Manufacturing Resources International, Inc., Alpharetta, GA (US)

(72) Inventors: William Dunn, Alpharetta, GA (US); Douglas Bennett, Alpharetta, GA (US); John Schuch, Buford, GA (US)

(73) Assignee: Manufacturing Resources International, Inc., Alpharetta, GA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 19/073,989

(22) Filed: Mar. 7, 2025

Related U.S. Application Data

(63) Continuation-in-part of application No. 19/027,695, filed on Jan. 17, 2025.

(60) Provisional application No. 63/549,012, filed on Feb. 2, 2024.

(51) Int. Cl.
H04L 9/40 (2022.01)
H04L 9/32 (2006.01)

(52) U.S. Cl.
CPC .................................. *H04L 9/3247* (2013.01)

(58) Field of Classification Search
CPC ..................................................... H04L 9/3247
See application file for complete search history.

(56) References Cited

U.S. PATENT DOCUMENTS

| | | | |
|---|---|---|---|
| 8,745,206 B1 * | 6/2014 | Chang | ................ H04N 21/6581 |
| | | | 709/224 |
| 9,465,923 B2 * | 10/2016 | Shen | ....................... G06F 21/10 |
| 11,088,772 B1 * | 8/2021 | Wright | ............. H04N 21/44008 |
| 11,588,889 B1 * | 2/2023 | Sendurpandian | ......... H04L 9/12 |
| 11,711,555 B1 | 7/2023 | Sendurpandian et al. | |
| 2002/0112162 A1 | 8/2002 | Cocotis et al. | |
| 2006/0242399 A1 * | 10/2006 | Zimmer | ................ G06F 9/4401 |
| | | | 713/2 |
| 2007/0028111 A1 | 2/2007 | Covely | |
| 2008/0180571 A1 | 7/2008 | Chuang | |
| 2009/0081993 A1 * | 3/2009 | Shihab | .................. H04L 1/0045 |
| | | | 455/412.1 |
| 2010/0011392 A1 | 1/2010 | Bronstein et al. | |

(Continued)

FOREIGN PATENT DOCUMENTS

| | | |
|---|---|---|
| EP | 0883284 A2 | 12/1998 |
| WO | 2004027606 A1 | 4/2004 |

*Primary Examiner* — Ghodrat Jamshidi
(74) *Attorney, Agent, or Firm* — Standley Law Group LLP; Jeffrey S. Standley; Adam J. Smith

(57) ABSTRACT

Display assemblies with data security and authentication features, along with related systems and methods are provided. The display assembly includes a processing device in electronic communication with a media player and an electronic display. The processing device checks for a valid digital signature in files received from the media player for playing at the electronic display. Only if the valid digital signature is found will the processing device allow the received video file to be played at the electronic display.

21 Claims, 3 Drawing Sheets

(56)                    References Cited

U.S. PATENT DOCUMENTS

| | | | |
|---|---|---|---|
| 2010/0062844 A1* | 3/2010 | Crowder, Jr. ......... | G06F 21/575 |
| | | | 463/29 |
| 2010/0177891 A1 | 7/2010 | Keidar et al. | |
| 2014/0181528 A1* | 6/2014 | Ram ...................... | G06F 21/64 |
| | | | 713/176 |
| 2014/0253813 A1 | 9/2014 | Bakar | |
| 2015/0033023 A1* | 1/2015 | Xu ...................... | H04N 21/8355 |
| | | | 713/176 |
| 2016/0117557 A1* | 4/2016 | Bettagere ............. | H04N 17/004 |
| | | | 382/100 |
| 2016/0198200 A1* | 7/2016 | Choi ................ | H04N 21/44222 |
| | | | 725/19 |
| 2016/0234333 A1* | 8/2016 | Yeh .......................... | H04L 47/27 |
| 2017/0163430 A1* | 6/2017 | Wu ....................... | H04M 15/48 |
| 2018/0332009 A1* | 11/2018 | Lange ................. | H04L 63/0428 |
| 2019/0033583 A1 | 1/2019 | Chauveau | |
| 2019/0089811 A1 | 3/2019 | White et al. | |
| 2019/0303670 A1* | 10/2019 | Bryden ................. | H04L 9/3239 |
| 2020/0004782 A1* | 1/2020 | Pereira ................... | G06V 20/40 |
| 2020/0244951 A1 | 7/2020 | Holloway et al. | |
| 2021/0120307 A1 | 4/2021 | Bastable et al. | |
| 2022/0303642 A1 | 9/2022 | Briercliffe | |
| 2024/0048394 A1 | 2/2024 | Völcker et al. | |
| 2024/0089522 A1* | 3/2024 | Ushakov ............. | G06F 16/7328 |

* cited by examiner

Receive video files

Embed valid digital signature

Call video files (on a file-by-file basis)

Valid digital signature present?

Yes

Play video file

No

Play blank screen, default image, or request next video file

VIDEO FILES WITH EMBEDDED DIGITAL SIGNATURES FOR DATA SECURITY AND AUTHENTICATION, RELATED SYSTEMS AND METHODS

CROSS-REFERENCE TO RELATED APPLICATIONS

This application is a continuation-in-part of U.S. application Ser. No. 19/027,695 filed Jan. 17, 2025, which claims the benefit of U.S. Provisional Application Ser. No. 63/549, 012 filed Feb. 2, 2024, the disclosures of each of which are hereby incorporated by reference as if fully restated herein.

TECHNICAL FIELD

Exemplary embodiments relate generally to video files with embedded digital signatures for providing data security and authentication, such as at display assemblies, and systems and methods related to the same.

BACKGROUND AND SUMMARY OF THE INVENTION

Digital out-of-home advertising is an increasingly popular medium for advertising and other announcements. Often, such advertising is accomplished using ruggedized electronic display assemblies designed for indoor, outdoor, or semi-outdoor applications. Among other components, these display assemblies may include a video player which is connected electronically to the electronic display to call up various video files for play. Any electronic connection is potentially vulnerable to various data security threats. Inappropriate or otherwise undesirable content might be called up to play on such display assemblies, such as by malicious actors. Therefore, what is needed is a display assembly with data security and authentication features.

A display assembly with data security and authentication features is provided, along with related systems and methods. In exemplary embodiments, a digital signature is embedded into authorized video files. The display assembly checks for the presence of the digital signature in all or some portion of the video frame data of the video or image files being displayed. If the signature is not present, the display assembly does not play the file and instead plays another file, a default image, and/or a blank screen by way of non-limiting example. If the signature is found, the display assembly proceeds to display the image or video. The digital signature may comprise a string of alphanumeric characters which replace all or part of a line of the image file and/or all or part of certain pixels thereof. The portion of the video file replaced may be provided at an area normally obfuscated from view, such as located behind part of a frame or the black mask area of a cover layer. Preferably, the digital signature is embedded utilizing the least significant bit or bits of the first row of pixels. The digital signature file may be created using one or more random character generators, ciphers, encryption techniques, combinations thereof, or the like.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
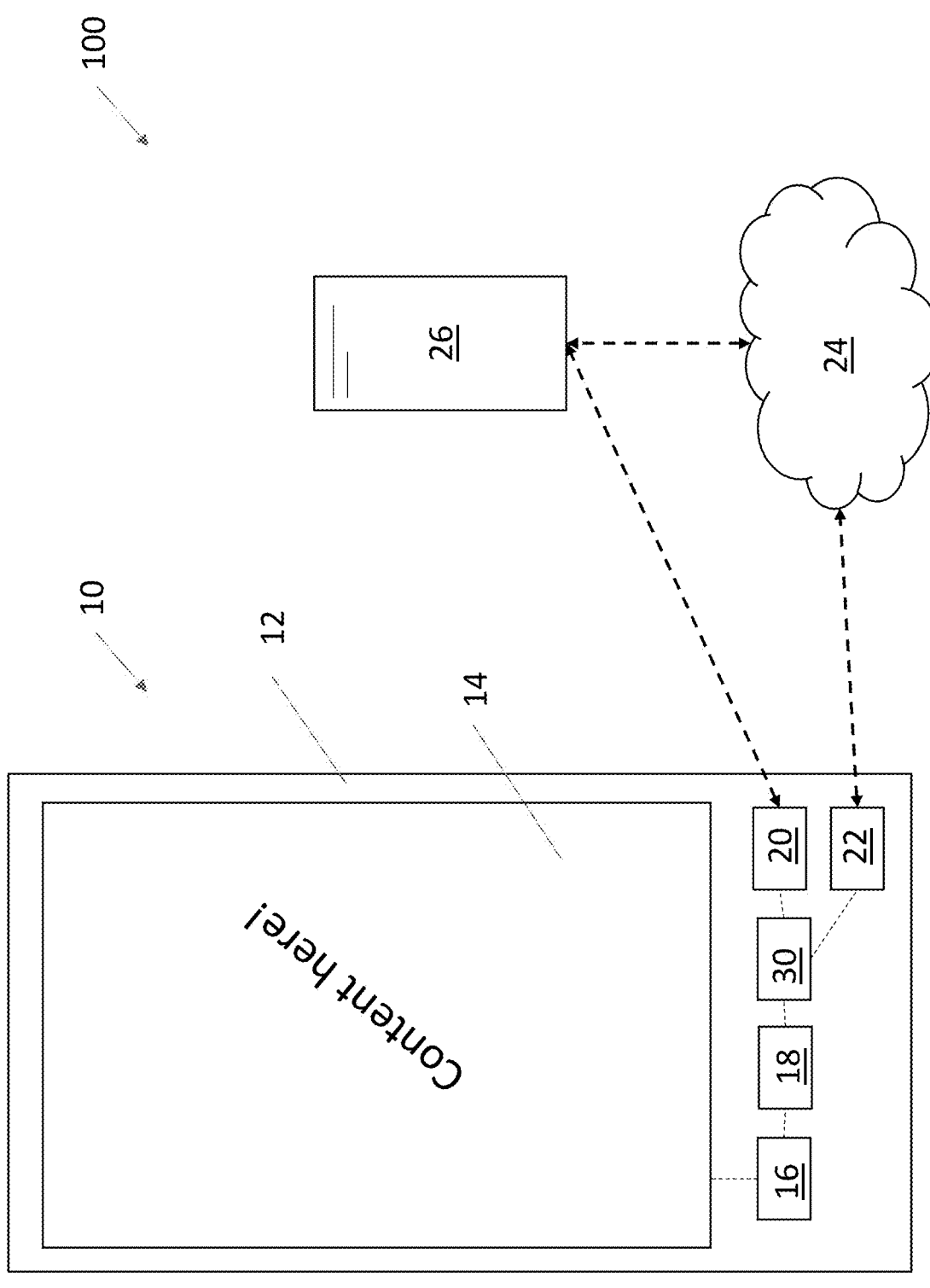
FIG. 1 is a front view of an exemplary display assembly with data security features.
Figure 2:
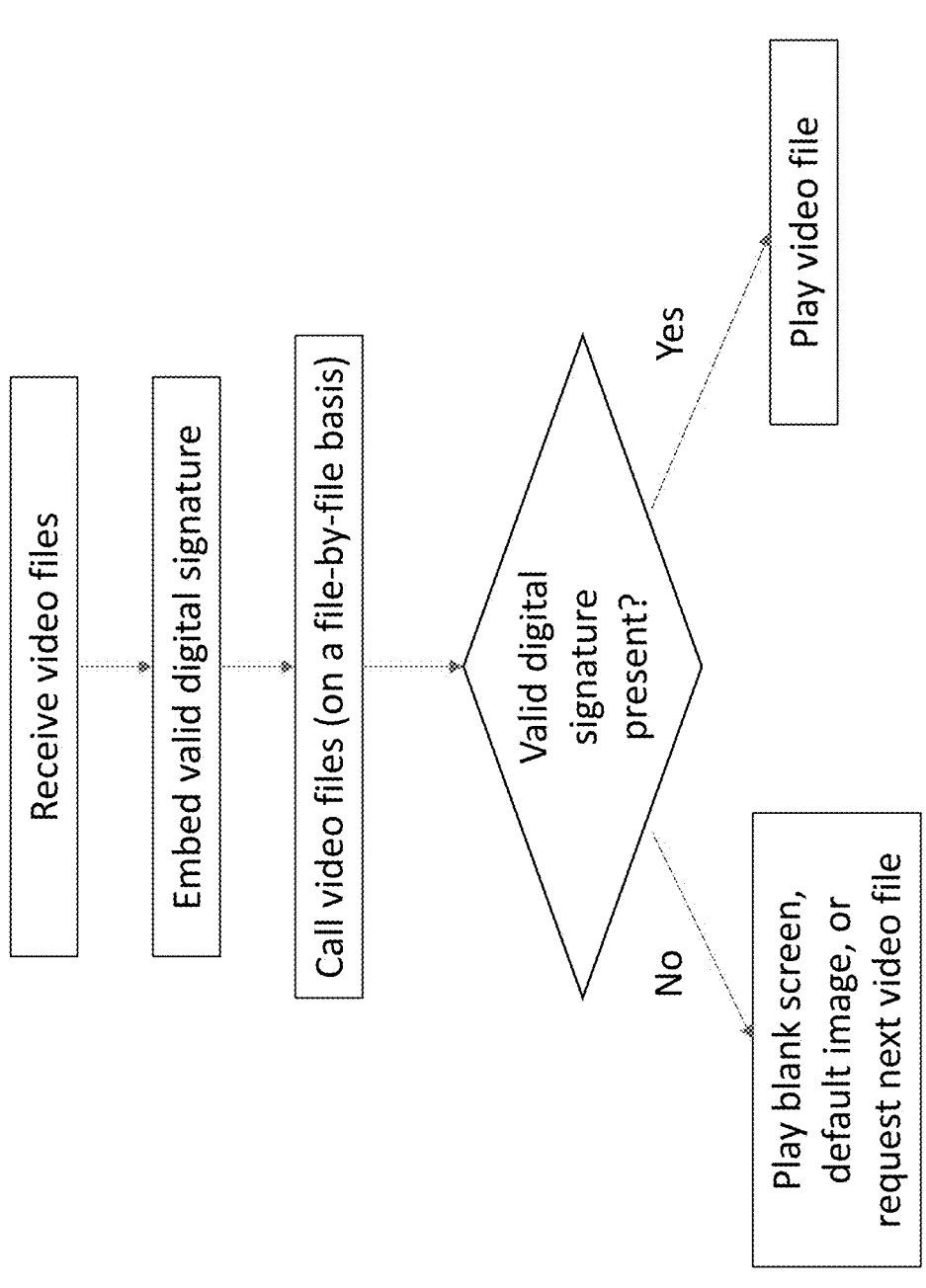
FIG. 2 is a flow chart with exemplary logic for operating the display assembly of FIG. 1.

FIG. 1 illustrates a display assembly 10 with data security and authentication features and related system 100. FIG. 2 provides an exemplary method for operating the same.

The assembly 10 may comprise, by way of non-limiting example, some or all of the units and/or related components available from Manufacturing Resources International, Inc. of Alpharetta, Georgia, shown and/or described in at least US Pub. No. 2022/0132681 published Apr. 28, 2022, and/or shown and/or described in at least US Pub. No. 2023/0136695 published May 4, 2023, the disclosures of each of which are hereby incorporated by reference as if fully restated herein.

The assembly 10 may comprise a structural framework 12, which may comprise one or more members, housings, panels, combinations thereof, or the like. The assembly 10 may comprise one or more electronic displays 14. The electronic displays 14 may comprise liquid crystal type displays, though any type or kind of display may be utilized. Any number and/or arrangement of the electronic displays 14 may be utilized.

The assembly 10 may comprise a processing device 16, such as but not limited to a processor, a field programmable gate array (FPGA), and/or other programmable logic device, in electronic communication with the electronic display 14. A media player 18 may be in electronic communication with the processing device 16. A database 20 may be in electronic communication with the media player 18. Alternatively, or additionally, the media player 18 may be in electronic communication with a network connection device 22.

Content data 42 (e.g., videos, images, video and/or image files) for playing may be received by local physical connection (e.g., USB drive, etc.) or remote upload from one or more remote devices 26 by way of one or more networks 24 and the network connection device 22. The networks 24 may comprise one or more internets (e.g., worldwide web), intranets, cellular networks, near field communication networks, ad hoc networks, local area networks, combinations thereof, or the like. The remote devices 26 may comprise computers, servers, tablets, smartphones, combinations thereof, or the like. Content data 42 may optionally be stored at the database 20 locally for calling up. Alternatively, or additionally, content data 42 may be streamed by way of the network connection device 22 and the network(s) 24.

A digital signature embedding module 30 may be interposed between the media player 18, the database 20, and the network connection device 22. Alternatively, the digital signature embedding module 30 may be provided as part of the media player 18. Regardless, the digital signature embedding module 30 may be configured to add and/or replace a portion of the content data 42 with a digital signature 32. Such addition and/or replacement may be provided upon or after receiving the content data 42. The digital signature 32 may comprise one or more alphanumeric characters, by way of non-limiting example.

The digital signature embedding module 30 may be configured to generate the digital signature 32 using one or more cryptographic techniques, random character generators, combinations thereof, or the like. In exemplary embodiments, without limitation, the digital signature embedding module 30 is configured to replace or overlay the data representing the first several pixels, or portions thereof, of received content data 42 with the digital signature 32. However, any size, location, or the like of the digital signature 32 within the content data 42 may be utilized. In other exemplary embodiments, the digital signature embedding module 30 may be provided at the remote device(s) 26, which may add the digital signature 32 before transmission to the display assembly 10.

The larger file comprising the content data 42 and the digital signature 32 may be referred to herein as a content file 44. However, the digital signature 32 need not necessarily be part of the same file as the content data 42.

Once a content file 44 is called up, the processing device 16 may be configured to check for a presence of the digital signature 32 before displaying the content file 44, and/or the content data 42 thereof, at the electronic display 14. For example, without limitation, the processing device 16 may be configured to check a known location of the digital signature 32 within the content file 44 for the digital signature 32 (e.g., the first several pixels). The processing device 16 may be configured to verify the authenticity of the presented digital signature 32. For example, without limitation, the processing device 16 may be provided with an encryption key, acceptable signature parameters (e.g., number and placement of certain types of characters, inclusion of certain types of characters, combinations thereof, or the like), ciphers, stored acceptable passcodes, combinations thereof, or the like which are used to verify the presented signature.

Where a valid digital signature 32 is present, the processing device 16 may proceed to display the content file 44, and/or the content data 42 thereof, at the electronic display 14, or multiple such displays. Where no valid digital signature 32 is found, the processing device 16 may play a blank screen, a default image or video content and/or file, and/or request that a next content file 44 in a programming order be provided. The process may be repeated for some, or all, content files 44 presented. The same or similar process may be utilized for displaying static images at the electronic display(s) 14.

The digital signature embedding module 30 may be configured to add or replace a specific, predetermined portion of the content data 42 with a valid digital signature 32 and/or add the digital signature 32 at a specific location or locations relative to the content data 42, such as part of a content file 44. For example, without limitation, the digital signature embedding module 30 may be configured to add or replace the first several pixels of a respective image/frame of the content data 42 with the digital signature 32. Other locations may be utilized, such as but not necessarily limited to, as shown and/or described herein.

Some, or all, of the displayed images of a given content data 42 and/or content file 44 may contain the digital signature 32. For each content file 44 containing video content data 42, only a certain image/frame (e.g., first image/frame, though it could be some other predetermined image/frame such as the second images/frame or so forth) may contain the digital signature 32 and the processing device 16 may be configured to only check for the presence of a valid digital signature 32 for such images/frames. However, in other exemplary embodiments, without limitation, the digital signature embedding module 30 may be configured to replace all images/frames of the content data 42 of a given content file 44 with a valid digital signature 32 and the processing device 16 may be configured to check for the presence of a valid digital signature 32 in all such images/frames. Other combinations may be utilized.

In other exemplary embodiments, without limitation, the processing device 16 may be configured to remove the digital signature 32 from the content file 44 once determined to be present. For example, without limitation, the digital signature 32 may optionally be provided following upload of the content data 42, and removed once checked by the processing device 16 such that only the content data 42 remains.

Where the digital signature 32 is left in the content data 42 such that the digital signature 32 is displayed as part of the image/video of the content data 42, it is preferably placed at a portion of the image/video of the content data 42 not readily or otherwise visible, such as at a portion of the electronic display 14 located behind a mask area and/or blank ink printed area of a cover layer (e.g., glass and/or plastic) positioned forward of, and optionally spaced apart from, a display layer (e.g., LCD layer). The cover layer may be part of the electronic display 14 or separate therefrom.

Where multiple electronic displays 14 are provided, such as at a common assembly 10, some or all components may be provided for each unit 10 and/or shared in common with the electronic displays 14.

The digital signature 32 may be embedded into some or all of the content data 42 (e.g., some or all images of image files, some or all images of video files, etc.,) such as, but not limited to, the first image only or every image, by way of the digital signature embedding module 30. The processing device 16 may be configured to check for the digital signature 32 at only some or all of the content data 42, such as but not limited to, the first image only or every image, accordingly. While files are sometimes shown or discussed, the same or similar process(es) may be utilized for individual image frames, such as on an image-by-image and/or file-by-file basis.

The digital signature embedding module 30 may be configured to only generate valid digital signatures 32, e.g., having a digital signature 32 and/or producing digital signatures 32 meeting the validation criteria. These may be referred to candidate digital signatures 32. The candidate digital signatures 32 may be predetermined. For example, without limitation, a plurality of candidate digital signatures 32 may be stored and used in a cycle. In such embodiments, the processing device 16 may be configured to check for an exact match for each of the digital signatures 32, such as on a table lookup basis.

Alternatively, or additionally, the candidate digital signatures 32 may be generated, such as on an as-needed basis and/or on-demand, in accordance with one or more validation criteria. For example, without limitation, the digital signature 32 might be required to be a predetermined length, within predetermined length parameters, have certain characters or types of characters, such as in certain locations, be summed or otherwise combined into various values, combinations thereof, or the like. A variety of validation characteristics may be utilized. In such embodiments, the digital signature embedding module 30 may be configured to utilize random number and/or character generators specified to certain characters and/or sizes, utilize algorithms or other logic to only place certain character types at certain locations within the content file 44, combinations thereof, or the like. In such embodiments, the processing device 16 may be configured to check to see if the provided digital signature 32 matches a predetermined set of criteria. The processing device 16 may comprise algorithms or other logic to check for digital signatures 32 of a certain size, that have certain characters or types of characters, such as in certain locations, be summed or otherwise combined into various values, combinations thereof, or the like.

The digital signature embedding module 30 and processing device 16 may be provided at each display assembly 10 such that signature embedding and checks are performed locally. In other exemplary embodiments, without limitation, the digital signature embedding module 30 is common to two or more of the display assemblies 10 such that signature embedding is performed centrally. Alternatively, or additionally, the processing device 16 may be common to two or more of the display assemblies 10 such that a signature check is performed centrally. Preferably, however, at least the processing device 16, if not also the digital signature embedding module 30, is local to each display assembly 10 for enhanced security, such as by placing the check for a valid digital signature 32 at a location with less exposure to security vulnerabilities.

Figure 3:
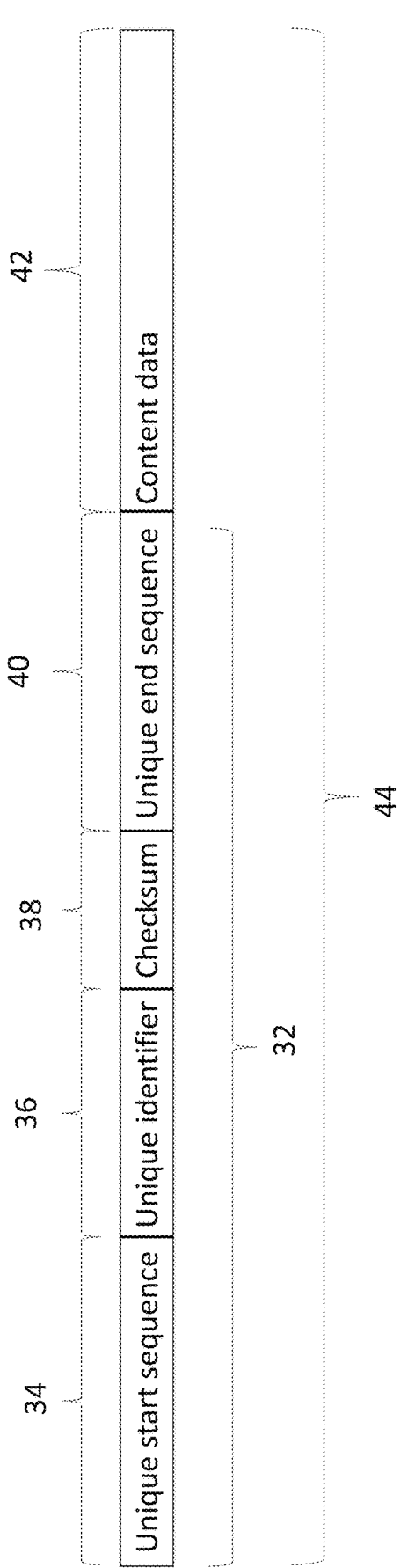
FIG. 3 is a data structure diagram for an exemplary content file and associated digital signature for use with the system and method of FIGS. 1-2.

As illustrated with particular regard to FIG. 3, the digital signatures 32 may comprise one or more of: a unique start sequence 34, a unique identifier 36, a checksum 38 (e.g., for the unique identifier 36), and a unique end sequence 40. In exemplary embodiments, without limitation, the digital signatures 32 may begin with the unique start sequence 34, which may be followed by the unique identifier 36, which may be followed by the checksum 38, which may be followed by the unique end sequence 40.

The content data 42 may follow after the digital signature 32. However, in other exemplary embodiments, without limitation, the end unique sequence 40 is provided after the content data 42 which may follow the checksum 38. Alternatively, or additionally, the digital signature 32 may replace a portion of the content data 42. Such replacement is preferably at or towards the beginning of the content data 42, though other locations may be utilized. For example, without limitation, the digital signature 32 may replace a portion of the content data 42 corresponding to one or more pixels otherwise located at a corner of the electronic display 14, behind a black mask area of a cover layer of or for the electronic display 14, along an edge of the electronic display 14, combinations thereof, or the like.

The digital signature 32 may replace one or more least significant bits (LSB) of the content data 42. The LSB may include, but are not necessarily limited to, the bit or bits corresponding to the first row of pixels.

The digital signature 32 may be provided before, as part of, or otherwise in association with, a content file 44. In exemplary embodiments, without limitation, the digital signature 32 is provided before the content data 42 and as part of the content file 44. However, the digital signature 32 may optionally be provided as a first file, separate from but associated with, a second file with the content data 42.

The digital signature 32 may be added to the content data 42 and/or content file 44, and/or the content file 44 may be generated by, the digital signature embedding module 30 in exemplary embodiments, without limitation.

The processing device 16 may be configured to determine a location of the unique identifier 36 and/or checksum 38 based, at least in part, on a location of one or both of: the unique start sequence 34 and the unique end sequence 40. The processing device 16 may, alternatively, or additionally, be configured to determine that a new or next content file 44 and/or content data 42 is received based on the presence and/or location of the unique start sequence 34 and/or the unique end sequence 40. The processing device 16 may, alternatively, or additionally, be configured to confirm that the next content file 44 and/or content data 42 is fully received based on presence and/or location of the unique start sequence 34 and/or the unique end sequence 40.

The processing device 16 may, alternatively, or additionally, be configured to determine a location of the content data 42 of a content file 44 based on a location of the unique start sequence 34 and/or unique end sequence 40.

The receipt of the unique start sequence 34 may cause the processing device 16 to monitor for the unique identifier 36, checksum 38, content data 42 and/or unique end sequence 40. The receipt of the unique end sequence 40 may cause the processing device 16 to conclude such a search.

Each of the unique start sequence 34, the unique identifier 36, the checksum 38, and the unique end sequence 40 may comprise multiple bits. By way of non-limiting example, the unique start sequence 34 may comprise 32 bits, the unique identifier 36 may comprise 64 or 128 bits, and the unique end sequence 40 may comprise 32 bits. The content data 42 may be of various size, such as to accommodate various size content data. Other sizes may be utilized.

In exemplary embodiments, without limitation, the unique identifier 36 matches or otherwise corresponds with a unique content identifier which may be provided by a content management system (CMS) or other trusted source providing the content data 42 and/or content files 44. The unique identifier 36 may be an exact match of a further generated version of the unique content identifier (e.g., characters added, changed, removed, encrypted, randomized, combinations thereof, or the like). Alternatively, the unique identifier 36 may be generated by the digital signature embedding module 30 based on one or more predetermined criteria (e.g., length, character type, randomization, encryption, combinations thereof, or the like) such that it does not necessarily match or correspond to the unique content identifier.

The checksum 38 may comprise a series of characters comporting with the unique identifier 36. In exemplary embodiments, without limitation, the processing device 16 is configured to evaluate the checksum 38 for comporting with the unique identifier 36, or vice-versa, for the digital signature 32 to be considered present and valid. One or more known checksum techniques may be utilized for such validation, including but not necessarily limited to, cyclic redundancy check, MD5, SHA, Alder-32, Fletcher's Checksum, HMAC, XOR-based checksums, combinations thereof, or the like. In this way, the digital signature 32 may be processed relatively quickly, and optionally locally, at the display assembly 10 for authenticity. The checksum 38 may be generated locally, such as by the digital signature embedding module 30, based on the unique identifier 36 and the one or more known checksum techniques in exemplary embodiments, without limitation.

Alternatively, or additionally, the processing device 16 may be configured to evaluate whether the unique identifier 36 meets certain predetermined requirements for the digital signature 32 to be considered present and valid, such as but not limited to, matching stored valid unique identifiers, meeting certain length and/or characteristic parameters, combinations thereof, or the like.

The unique identifier 36 may comprise a series of characters matching or otherwise corresponding with the unique content identifier, such may be stored at an electronic database of valid unique identifiers. The database of valid unique identifiers may be local to the display assembly 10 (e.g., database 20) and/or remote from the display assembly 10 (e.g., remote device(s) 26). The database of valid unique identifiers may be part of, and/or managed by a content management system (CMS).

The CMS may be run by and/or accessible by the local media player 18, in exemplary embodiments, without limitation. The digital signature embedding module 30 may be configured to query CMS, such as by way of an API, to retrieve and/or determine the unique content identifier and/or unique identifier 36. The processing device 16 may be configured to query the CMS to determine if a received unique identifier 36 matched a known, valid unique content identifier. A respective valid unique identifier 36 may be stored for each content file 44 and/or respective portion of content data 42 for a given content item (e.g., advertising image, advertising video) in exemplary embodiments, without limitation.

Alternatively, or additionally, the valid unique identifiers 36 may be generated, such as by way of the digital signature embedding module 30 in accordance with one or more predetermined parameters (e.g., signature length, coding, character type and/or location, characteristics, combinations thereof, or the like).

A respective digital signature 32 may be used for each content file 44 and/or respective portion of content data 42 for a given content item (e.g., advertising image, advertising video). A single digital signature 32 may be provided with each content file 44 and/or respective portion of content data 42 for a given content item. In other exemplary embodiments, without limitation, the digital signature 32 may be repeatedly embedded in a content file 44, such as at some or all frames of a video file.

The digital signature embedding module 30 may be configured to generate and/or insert a valid digital signature 32 into a respective content file 44 with a respective portion of content data 42 received from a trusted source, such as but not necessarily limited to, a trusted CMS. Alternatively, or additionally, some or all parts of the valid digital signature 32 may be pre-provided with the respective content file 44 and/or respective portion of content data 42. In exemplary embodiments, without limitation, the unique identifier 36 is provided with the content data 42 and/or is generated in accordance with (e.g., matching, an encrypted and/or encoded version thereof, and/or modified in some other predetermined way) the same. In other exemplary embodiments, without limitation, the unique identifier 36 is generated by the digital signature embedding module 30, such as locally at the display assembly 10 following receipt of the content data 42 and/or a content file 44.

These techniques may assist with preventing the playing of unauthorized content. This may be particularly important in the world of digital out-of-home advertising, for example, where a large number of such assemblies 10 are generally operated remotely.

The candidate digital signatures may be different for each file, though such is not necessarily required.

While video files are sometimes shown and/or described herein, the disclosed technology may be utilized with regard to static image files, such as a single image which is displayed for a period of time.

The steps shown and/or described herein may be repeated and/or performed in various orders. For example, without limitation, the files may be received on an ongoing basis, the valid digital signatures may be assigned on an ongoing basis, and/or the files may be checked for valid digital signatures on an ongoing basis. These steps may be performed independent of one another, such as on a parallel basis. These steps may be performed as needed and/or on a batch basis, by way of example.

Any embodiment of the present invention may include any of the features of the other embodiments of the present invention. The exemplary embodiments disclosed herein are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphones, tablets, databases, servers, or the like. The electronic connections and transmissions described herein may be accomplished by one or more wired or wireless connectively components (e.g., routers, modems, ethernet cables, fiber optic cable, telephone cables, signal repeaters, and the like) and/or networks (e.g., internets, intranets, cellular networks, the world wide web, local area networks, and the like). The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold solely non-transitory signals.

What is claimed is:

1. A display assembly with data security and authentication features, said display assembly comprising:
    an electronic display;
    a media player; and a processing device in electronic communication with the media player and the electronic display, wherein the processing device comprises one or more of: a non-transitory electronic storage device comprising executable software instructions and a processor for carrying out said software instructions, a field programmable gate array, and a programmable logic device, wherein said processing device is configured to:

receive content files from the media player comprising content data and, at least some of which comprise a digital signature, wherein each valid digital signature includes a unique start sequence and a unique identifier following the unique start sequence, and on a file-by-file basis for each of the received content files:

determine if the digital signature is present and valid, including locating the unique identifier for review based, at least in part, on a location of on the unique start sequence;

where the digital signature is determined to be present and valid, permit the content data of the respective content file to be played at the electronic display; and prevent the content data of the respective content file from being played at the electronic display, cause a blank screen to be played at the electronic display, cause a default content file to be played at the electronic display, or request a next content file to be played at the electronic display where any one or more of: the digital signature is determined to not be present, and the digital signature is determined to be invalid.

2. The display assembly of claim 1 wherein:
the processing device is configured to determine, on the file-by-file basis for each of the received content files, if the digital signature comprises the unique start sequence as part of determining if the digital signature is present and valid.

3. The display assembly of claim 2 wherein:
the processing device is configured to determine, on the file-by-file basis for each of the received content files, if the digital signature comprises the unique identifier following the unique start sequence as part of determining if the digital signature is present and valid.

4. The display assembly of claim 3 wherein:
the digital signature of at least some of the content files, including all of the content files having one of the valid digital signatures, comprises a checksum for, and following, the unique identifier; and
the processing device is configured to determine, on the file-by-file basis for each of the received content files, if the digital signature comprises the checksum following the unique identifier and if the checksum comports with the unique identifier as part of determining if the digital signature is valid.

5. The display assembly of claim 3 wherein:
the processing device is in electronic communication with a database of valid unique content identifiers; and
the processing device is configured to determine, for each of the received content files, if the unique identifier matches or comports with one of the valid unique content identifiers as part of determining if the digital signature is valid.

6. The display assembly of claim 3 wherein:
the processing device is configured to determine, for each of the received content files, if the unique identifier comports with predetermined criteria as part of determining if the digital signature is valid.

7. The display assembly of claim 1 wherein:
each of the valid digital signatures further comprises a checksum following the unique identifier; and
the processing device is configured to determine if the checksum comports with the unique identifier as part of determining if the respective digital signature is valid.

8. The display assembly of claim 7 wherein:
each of the valid digital signatures further comprises a unique end sequence following the checksum; and
the processing device is configured to locate the unique identifier based, at least in part, on a location of the unique end sequence.

9. The display assembly of claim 7 wherein:
each of the valid digital signatures further comprises a unique end sequence following the content data; and
the processing device is configured to locate the content data based, at least in part, on a location of the unique end sequence.

10. The display assembly of claim 9 wherein:
the unique start sequence is 32 bits;
the unique identifier is 32 or 128 subsequent bits; and
the unique end sequence is 32 bits.

11. The display assembly of claim 1 further comprising:
a digital signature embedding module comprising one or more non-transitory electronic storage devices comprising executable software instructions, which when executed, configure one or more processors to, on the file-by-file basis for each of the received content files:
generate the checksum based on the unique identifier; and
insert a respective one of the digital signatures and a respective portion of content data corresponding to a respective content item into each of the content files for each of the content items received at the display assembly from a trusted source.

12. The display assembly of claim 11 wherein:
the digital signature embedding module is configured to, on the file-by-file basis for each of the received content files, overwrite a sub-portion of the portion of content data for the content items with the digital signature.

13. The display assembly of claim 11 wherein:
the digital signature embedding module is configured to:
receive a unique content identifier with each of the content items from the trusted source;
utilize said unique content identifier as the unique identifier; and
generate the content file comprising the respective portion of the content data and the digital signature.

14. The display assembly of claim 13 wherein:
the trusted source comprises a content management system.

15. The display assembly of claim 1 wherein:
the display layer comprises a liquid crystal layer;
the electronic display comprises a backlight for the liquid crystal layer;
a network connection device configured to receive the content files from one or more remote devices; and
a database for storing the files.

16. The display assembly of claim 1 further comprising:
a digital signature embedding module comprising one or more non-transitory electronic storage devices comprising executable software instructions, which when executed, configure one or more processors to, on the file-by-file basis for each of the received content files, replace one or more least significant bits of respective content files with the digital signatures.

17. The display assembly of claim 16 wherein:
the least significant bits include one or more bits associated with the content data for a first row of pixels for the electronic display.

18. The display assembly of claim 16 wherein:
the digital signature embedding module is configured to, on the file-by-file basis for each of the received content files: generate the checksum based on the unique identifier.

19. A system providing data security and authentication features for display assemblies, said system comprising:
a digital signature embedding module one or more non-transitory electronic storage devices comprising executable software instructions, which when executed, configure one or more processors to insert a respective valid digital signature into each of a plurality of content files for playing at the display assemblies; and
the display assemblies, each comprising:
an electronic display;
a media player; and
a programmable logic device in electronic communication with the media player and the electronic display, wherein the programmable logic device is configured to:
receive content files from the media player comprising content data, and at least some of which further comprise a respective digital signature comprising a unique start sequence, a unique identifier, a checksum, and a unique end sequence;
determine, for each of the received content files on a file-by-file basis, if the respective digital signature is present and valid, including by:
locating and extracting the unique identifier and checksum based, at least in part, on a location of the unique start sequence and the unique end sequence; and
determine if the unique identifier comports with the checksum; and
where the respective digital signature is determined to be valid and present for the respective content file, allow the content data of the respective content file to be played at the electronic display.

20. The system of claim 19 wherein:
the digital signature embedding module is further configured to, on the file-by-file basis for each of the received content files:
generate the checksum based on the unique identifier; and
insert the respective one of the digital signatures and a respective portion of content data corresponding to a respective content item into each of the content files for each of the content items received at the display assembly from a trusted source; and
the programmable logic device is further configured to prevent the content data of the respective content file from being played at the electronic display, cause a blank screen to be played at the electronic display, cause a default content file to be played at the electronic display, or request a next content file to be played at the electronic display where any one or more of: the digital signature is determined to not be present, and the digital signature is determined to be invalid.

21. A method of providing data security and authentication for a display assembly, said method comprising:
checking, at a processor, for a valid digital signature in each content file received from a media player for playing at an electronic display of the display assembly by:
identifying a unique start sequence of a digital signature of the content file;
identifying a unique end sequence of the digital signature of the content file;
identifying a unique identifier and a checksum of the digital signature of the content file based, at least in part, on a location of the unique start sequence and the unique end sequence; and
determine if the unique identifier comports with the checksum; and
only allow content data of the content file to be displayed at an electronic display of the display assembly where the valid digital signature is found at the content file.

* * * * *